J. A. JURDAN.
SAW.
APPLICATION FILED MAY 9, 1917.
1,262,955.
Patented Apr. 16, 1918.
3 SHEETS—SHEET 1.
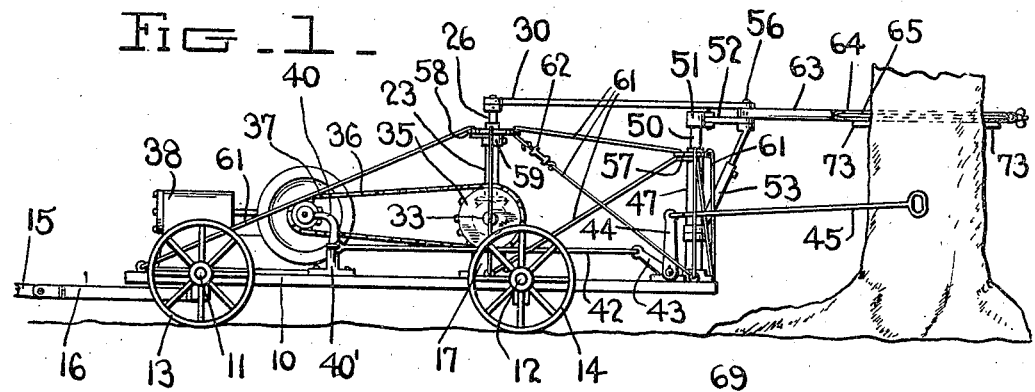
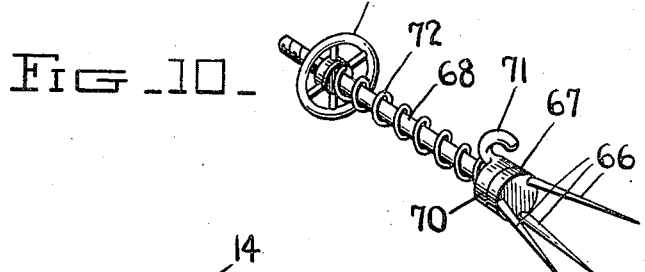
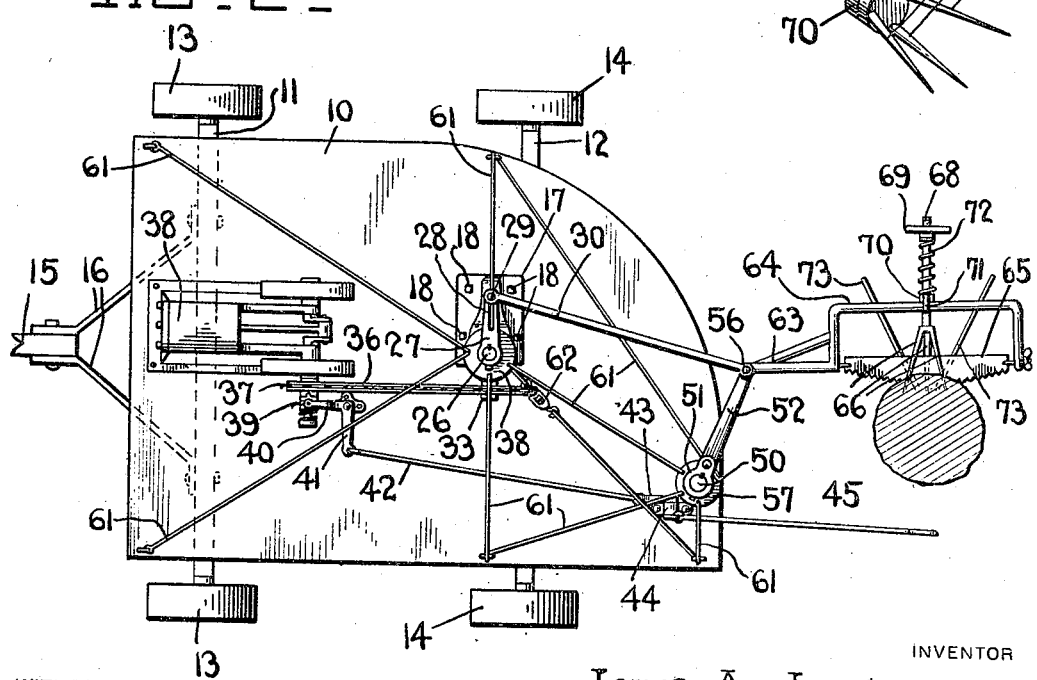
WITNESSES
INVENTOR
James A. Jurdan
BY
ATTORNEY

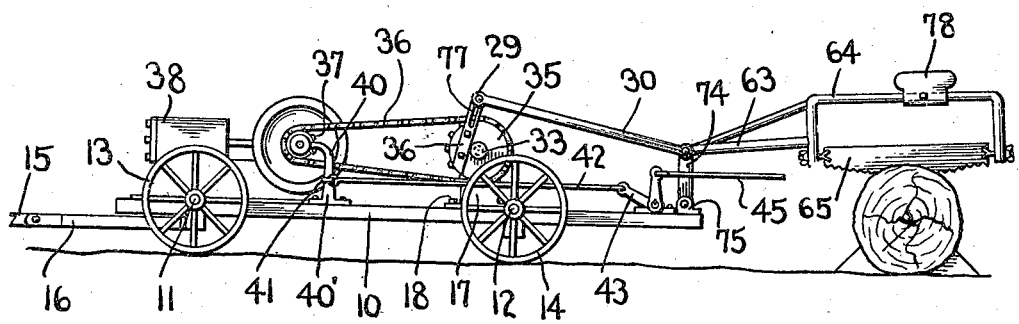
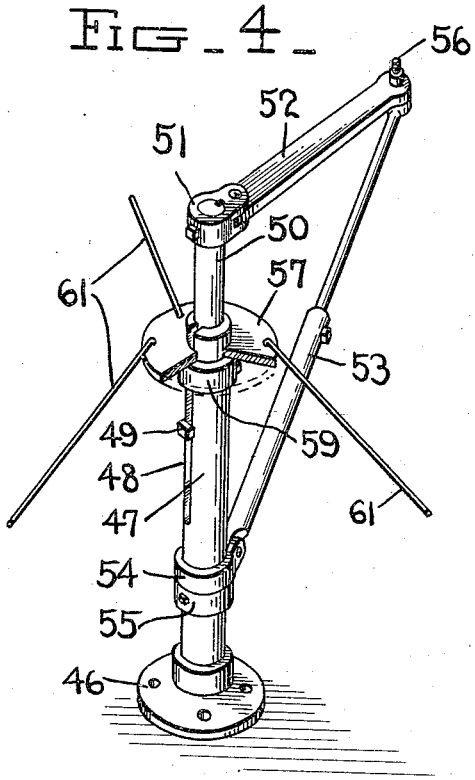
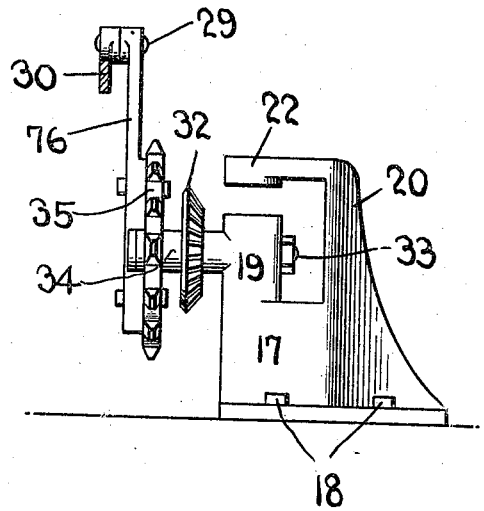

J. A. JURDAN.
SAW.
APPLICATION FILED MAY 9, 1917.

1,262,955.

Patented Apr. 16, 1918.
3 SHEETS—SHEET 3.

WITNESSES

INVENTOR
James A. Jurdan
BY
ATTORNEY

UNITED STATES PATENT OFFICE.

JAMES A. JURDAN, OF LOS ANGELES, CALIFORNIA.

SAW.

1,262,955.  Specification of Letters Patent.  Patented Apr. 16, 1918.

Application filed May 9, 1917.  Serial No. 167,553.

*To all whom it may concern:*

Be it known that I, JAMES A. JURDAN, a citizen of the United States, residing at Los Angeles, in the county of Los Angeles and State of California, have invented certain new and useful Improvements in Saws, of which the following is a specification.

This invention relates to an improved saw and the principal object of the invention is to provide a saw of the power driven type so constructed that it may be used for cutting down trees or for cutting logs after the trees have been cut down, the machine being so constructed that it can be easily and quickly converted from one form to the other.

Another object of the invention is to so construct this machine that a saw blade of the usual construction may be used in connection with the machine thus making it unnecessary to provide an especially constructed type of blade.

Another object of the invention is to provide improved means for mounting and actuating the blade carrying frame.

Another object of the invention is to so construct this machine that the saw blade may be positioned the desired height from the ground when cutting down a tree, this being, of course, regulated according to the height of the tree.

Another object of the invention is to provide improved means for guiding the movement of the saw blade and for yieldably holding the blade in contact with the tree being cut.

Another object of the invention is to provide a machine of the character described which will comprise a comparatively few number of parts and which will be easy to assemble and when assembled will be strong and durable and not liable to easily break or get out of order.

This invention is illustrated in the accompanying drawings, wherein:—

Figure 1 is a view showing the machine in side elevation and in position for use for cutting down a tree.

Fig. 2 is a top plan view of the machine in position for use in cutting down a tree, the tree being shown in section.

Fig. 3 is a view in elevation showing the machine in position for use in sawing a fallen tree into logs.

Fig. 4 is a perspective view of a standard carrying means constituting carrying means for the saw blade frame.

Fig. 8 is a view of the structure shown in Fig. 5 with the super-structure removed as shown in Fig. 3.

Fig. 10 is a perspective view of the means for holding the blade in yielding engagement with the tree.

Figure 5:
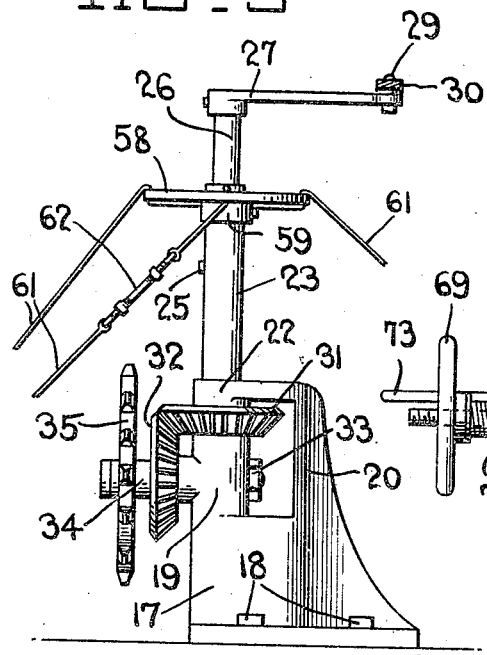
Fig. 5 is a view in elevation of the standard and actuating means for reciprocating the blade carrying frame.
Figure 7:
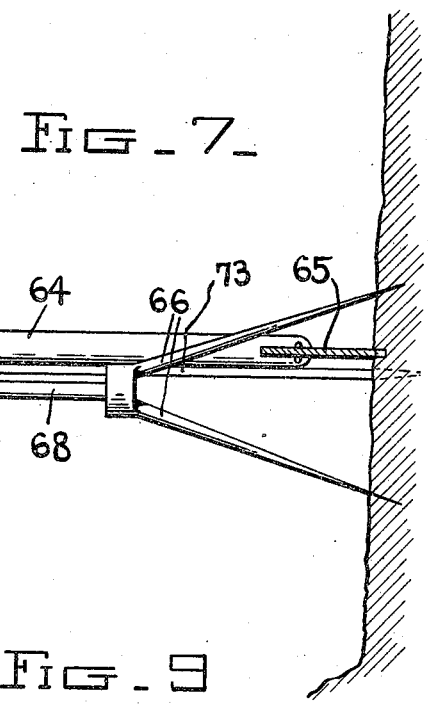
Fig. 7 is an enlarged view showing the means for guiding the blade carrying frame and holding the blade in engagement with the tree.

This sawing machine is provided with a carriage having a platform 10 supported upon forward and rear axles 11 and 12 which axles carry wheels 13 and 14. A tongue 15 is connected with the forward axle 11 by means such as arms 16 so that draft animals may be connected with the vehicle or carriage in order to draw the machine from one point to another. The carriage shown, illustrates a conventional form of carriage and it is to be understood that changes in its structure may be made, this carriage simply serving as a body for carrying the elements forming this sawing machine.

Figure 6:
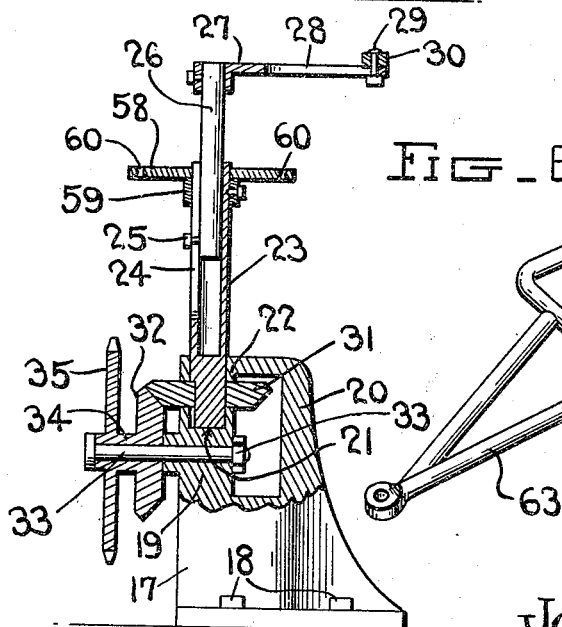
Fig. 6 is a view showing the structure of Fig. 5 in a vertical section.
Figure 9:
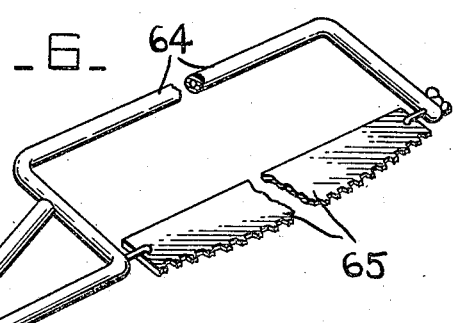
Fig. 9 is a perspective view showing the blade carrying frame and blade.

The actuating means for the saw carrying frame is provided with a base 17 secured to the platform at a point intermediate its length by fasteners 18, the base being provided in its upper end portion with spaced arms 19 and 20, which arms extend as shown in Figs. 5, 6 and 8 with the arm 19 provided with a socket 21 and the arm 20 extending to overhang the arm 19 and provided with a bearing 22 positioned above the socket 21. A tubular standard 23 is rotatably mounted in the bearing 22 and the socket 21 and is provided with a longitudinally extending slot 24 through which extends a set screw 25 releasably holding the shaft 26 in a vertically adjusted position. This shaft 26 carries an arm 27 extending at right angles to the core and having its free end portion provided with a slot 28 in which is slidably positioned the pin 29 or fastener for link 30. From an inspection of Fig. 6, it will be readily seen that this shaft 26 may be easily adjusted to bring the arm at the proper height above the platform.

In order to rotate the standard 23, this standard has been provided with a beveled gear 31 mounted upon the lower end portion thereof between the upper end of arm 19 and bearing 22 and meshing with a beveled gear 32 rotatable upon the axle or shaft 33 and provided with an integral hub extension 34 carrying a sprocket 35. A sprocket chain 36 passes about this sprocket wheel 35 and about a sprocket wheel 37 loose upon the shaft of the driving engine 38 which engine may be of any conventional form. This engine has been illustrated as an internal combustion engine but it it understood that any suitable type of engine or motor could be used. A clutch 39 is mounted upon the shaft of this engine and engaged by the arm 40 of the bell crank lever 41 mounted on bracket 40' and is yieldably held in engagement with the clutch hub of the sprocket 37. A link 42 leads from the bell-crank lever 41 and is connected with the arm of the shifting lever 44 and it will be readily seen that by drawing upon the rod 45, the lever 44 may be moved to act upon rod or link 42 and draw the clutch 39 out of engagement with the clutch of the sprocket 37 thus releasing the sprocket 37 and permitting the engine to rock without the saw being actuated. When the rod 45 is released, the spring will return the clutch into engagement with the clutch element of the sprocket and the saw will again be operated.

The saw frame carrying device, a perspective of which is shown in Fig. 4 is provided with a base 46 from which there extends a sleeve or standard 47 having a slot 48 formed therein to receive a set screw 49 holding the core 50 in a vertically adjusted position. This core 50 carries a bearing 51 with which the arm 52 is pivotally connected, the arm being braced by means of the longitudinally extending bracing arm or bar 53, the lower end of which is pivotally connected with the bearing collar 54. This bearing 54 rests upon collar 55 secured to the standard 47 and it will thus be seen that when in use, the arm 52 may be oscillated through the action of link 30 which fits upon the upper end of the bolt or pin 56 connecting the bracing bar with the arm. In order to brace the actuating device and carrying device, there has been provided disks 57 and 58 mounted upon the standards 23 and 47 and resting upon the supporting collar 59. These disks 57 and 58 are provided with openings 60 to receive the stays 61, a turnbuckle 62 being provided so that these stays may be tightened and the standards securely held in an upright position without the action of the sawing machine being interfered with.

When in use, the machine will be set up as shown in Figs. 1 and 2, if it is desired to cut down a tree with the handles or arms 63 of the frame 64 for carrying the blade 65 pivotally mounted upon the pin 66. This saw blade 65 is of the conventional form and therefore the ordinary saw used for cutting trees into logs may be used in connection with this machine. After the machine has been adjusted to the proper height, the pressure applying device shown in Fig. 10 will be put in place with the prongs 66 driven into the tree. These prongs 66 extend from a head 67 from which there also extends a rod or shaft 68 having a hand wheel 69 mounted upon its threaded outer end portions. A block or collar 70 having an engaging finger 71 extending therefrom for engaging the blade carrying frame 64, is slidably mounted upon the rod 68 and engaged by a spring 72 serving to yieldably hold the block 70 in engagement with the head 67 as shown in Fig. 10 and thus causing the blade 65 to be held in engagement with the tree. If desired, guiding bars 73 may also be driven into the tree to assist in guiding the sliding movement of the saw blade. When the engine is started, rotary movement is transmitted to the sleeve 23 and as this sleeve or hollow shaft rotates, the arm 27 will travel in the path of a circle with the pin 29 sliding in the slot 28. This will reciprocate the link 30 and as this reciprocating link is connected with the free end of arm 52, the arm 52 will be oscillated this imparting reciprocating movement to the blade carrying frame 64. As this frame reciprocates, the blade which is held under pressure will cut through the tree until the desired depth of cut has been made. The lever 44 can then be moved through the medium of rod 45 to throw the clutch 39 out of engagement with the clutch of sprocket 37 thus preventing further movement of the saw. It should be further noted that if for any reason it is desired to stop the sawing this can be done through throwing the clutch out of engagement with the clutch of the sprocket and thus prevent damage to the machine in case the blade should become caught in the cut formed in the tree.

When it is desired to use this machine for cutting a fallen tree into logs, the blade carrying frame will be disconnected from the arm 52 and will be connected with the link 74 which link will be pivotally connected with the platform by means of bearings 75. The link 30 will be connected with this link 74 and by means of its pin 29 will be connected with the arm 76, the arm 76 being connected with the sprocket wheel 35 and provided with a slot 77 permitting sliding of the pin 29. When the machine is transformed into a machine for cutting fallen trees into logs, the carrying means shown in Fig. 4 may be removed from the platform and also the standard 23 together with the gear 31 or if desired, these elements may be left in place and the link 30 and blade carrying frame simply removed and put in place as shown in Fig. 3, the arm 76 being of course connected with the gear 35 when this is done. When this machine is being used for cutting logs, the device for holding the blade against the tree under pressure shown in Fig. 2 may be used or if so desired, this may be done away with and a weight 78 temporarily put in place upon the blade carrying frame.

I have thus provided a machine which can be used for cutting trees and which can be also used for cutting fallen trees into logs, adjustment of the machine to accommodate it to the various uses being easy and quick to accomplish. I have further provided a machine comprising a comparatively few number of parts, easy to assemble and further so constructed that the machine will be strong and durable and not liable to easily get out of order or need repair.

What is claimed is:—

1. A sawing machine comprising a platform, a blade frame carrying element mounted upon the platform and including a standard and a frame carrying arm pivotally connected with the standard for oscillating movement, an actuating element comprising a base mounted upon the platform, a standard rotatably connected with the base, an arm extending from the upper portion of the standard, a link pivotally connected with the arm of the carrying element and slidably connected with the arm of the actuating element, a driving element mounted upon the platform, and means for transmitting rotary movement from the driving element to the rotatable standard of the actuating element whereby the standard of the actuating element may be rotated and oscillating movement transmitted to the arm of the carrying element for imparting reciprocating movement to a blade frame connected therewith.

2. A sawing machine comprising a carriage, standards mounted upon said carriage, one of said standards carrying a rotatable shaft having an arm extending therefrom and the second standard having an arm pivotally connected therewith and supported for oscillating movement, a link pivotally connected with the free end portion of the second arm and having sliding and pivotal connection with the first arm and imparting oscillating movement to the second arm as the shaft of the first standard rotates, a blade carrying frame pivotally connected with the second arm, a driving element mounted upon said carriage, and means for imparting rotary movement from the driving element to the shaft of the first mentioned standard.

3. A sawing machine comprising a carriage, saw frame carrying means including an arm pivotally mounted for oscillating movement and having the saw frame pivotally connected therewith, actuating means for the saw frame including a rotating element having an arm extending therefrom, a link pivotally connected with the oscillating arm and pivotally and slidably connected with the arm extending from the rotating element, and means for imparting rotary movement to the rotating element.

4. A sawing machine including a carriage, saw frame carrying means mounted upon said carriage, and actuating means mounted upon said carriage and comprising a standard having a base, a sleeve having its lower portion journaled in said base, a shaft fitting into said sleeve and releasably held in a set position, an arm extending from the shaft, means for imparting rotary movement to the sleeve, and a link having pivotal and slidable connection with the arm and having its opposite end portion connected with the frame carrying means for imparting oscillating movement thereto as the sleeve rotates.

5. A sawing machine comprising a carriage, actuating means mounted upon said carriage, blade frame carrying means mounted upon said carriage and comprising a standard including a tubular sleeve, a shaft fitting into the sleeve and releasably held in a set position, a bearing connected with the upper end portion of said shaft, and an arm pivotally connected with the bearing, a collar rotatably mounted upon the lower portion of said sleeve, a bracing arm connected with said collar and with the outer end portion of said arm, a blade carrying frame pivotally connected with the outer end portion of said arm, a link pivotally connected with said arm and with said actuating means, and means for imparting movement to the actuating means for oscillating said arm through the medium of said link.

6. A sawing machine comprising a carriage, means for movably carrying a blade frame connected with the base and including an oscillating arm, actuating means for the blade carrying frame mounted upon the carriage and comprising a base having a head provided with a socket in its upper end portion, an arm extending from the base and terminating in a bearing above the socket, a sleeve rotatably mounted in the socket and bearing, a gear mounted upon the sleeve between the socket and bearing, a gear meshing with the first mentioned gear and provided with an extension carrying a sprocket wheel, a shaft for the sprocket wheel and second gear extending from the head, an arm connected with and extending to one side of the sleeve, and a link connecting the oscillating arm with the last mentioned arm.

7. A sawing machine comprising a carriage, blade frame carrying means mounted upon said carriage and including a base, a sleeve extending above said base, a shaft in said sleeve, and an arm extending from said shaft for oscillating movement, actuating means mounted upon the carriage and including a base, a sleeve extending from the base, a shaft extending from the sleeve, and an arm extending from the shaft, a link slidably and pivotally connected with the arm of the actuating means and pivotally connected with the arm of the carrying means, collars loosely mounted upon said sleeves, stays connected with the carriage and with the collars to support the carrying means and actuating means in an upright position, and driving means having operative connection with the actuating means.

In testimony whereof I affix my signature in presence of two witnesses.

JAMES A. JURDAN.

Witnesses:
ALPHA J. ALLEN,
JAMES WATTERS.

Copies of this patent may be obtained for five cents each, by addressing the "Commissioner of Patents, Washington, D. C."